(12) United States Patent
Schumacher et al.

(10) Patent No.: US 11,987,311 B2
(45) Date of Patent: May 21, 2024

(54) LOCK SYSTEM

(71) Applicant: Robert Bosch GmbH, Stuttgart (DE)

(72) Inventors: Christoph Schumacher, Dusslingen (DE); Dennis Mehlo, Taipei (TW); Haris Alisic, Reutlingen (DE); Lisa Bayer, Stuttgart (DE); Thilo Koeder, Gerlingen (DE); Volker Jabs, Dusslingen (DE); Frank Hummel, Engstingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 329 days.

(21) Appl. No.: 17/612,685

(22) PCT Filed: Jul. 13, 2020

(86) PCT No.: PCT/EP2020/069689
§ 371 (c)(1),
(2) Date: Nov. 19, 2021

(87) PCT Pub. No.: WO2021/013593
PCT Pub. Date: Jan. 28, 2021

(65) Prior Publication Data
US 2022/0081049 A1 Mar. 17, 2022

(30) Foreign Application Priority Data
Jul. 19, 2019 (DE) .................. 10 2019 210 677.3

(51) Int. Cl.
B62H 5/00 (2006.01)
B62J 43/13 (2020.01)
B62J 43/20 (2020.01)

(52) U.S. Cl.
CPC ............. B62H 5/001 (2013.01); B62J 43/13 (2020.02); B62J 43/20 (2020.02)

(58) Field of Classification Search
CPC . B62H 5/00; B62H 5/001; B62H 5/006; B62J 11/00; B62J 11/02; B62J 43/00;
(Continued)

(56) References Cited

U.S. PATENT DOCUMENTS

| 4,044,852 A | 8/1977 | Lewis et al. | |
| 2013/0241170 A1* | 9/2013 | Talavasek | B62M 6/90 |
| | | | 429/97 |

(Continued)

FOREIGN PATENT DOCUMENTS

| DE | 102016124710 A1 * | 6/2017 | ............. B60L 50/64 |
| EP | 2868565 A1 | 5/2015 | |

(Continued)

OTHER PUBLICATIONS

International Search Report for PCT/EP2020/069689, dated Sep. 3, 2020.

*Primary Examiner* — Nathan Cumar
(74) *Attorney, Agent, or Firm* — NORTON ROSE FULBRIGHT US LLP; Gerard A. Messina

(57) ABSTRACT

A lock system for securing a battery of a vehicle operable by muscle power and/or motor power, in particular an electric bicycle. The lock system includes: a deadbolt which is pivotable about a bolt axis, a lock cylinder which is configured to actuate the deadbolt, and a lifting element which is coupled to the lock cylinder, the lock cylinder being movable into a holding position and into a release position, the lock cylinder in the holding position preventing a removal of the battery in a removal direction, and in the release position allowing the removal of the battery. The lifting element is configured to move the battery in the removal direction when the deadbolt is moved from the holding position into the release position.

20 Claims, 4 Drawing Sheets

(58) Field of Classification Search
CPC ... B62J 43/10; B62J 43/13; B62J 43/20; B62J 43/23; B62J 43/26
USPC .......................................................... 70/258
See application file for complete search history.

(56) References Cited

U.S. PATENT DOCUMENTS

2016/0288875 A1* 10/2016 Fujiwara ............. H01M 50/296
2018/0111652 A1*  4/2018 Halevi ................... B62H 5/001

FOREIGN PATENT DOCUMENTS

| EP | 3491685 A1 | 6/2019 |
| JP | H0911759 A | 1/1997 |
| WO | 2018019441 A1 | 2/2018 |

* cited by examiner

LOCK SYSTEM

FIELD

The present invention relates to a lock system for securing a battery of a vehicle operable by muscle power and/or motor power, in particular an electric bicycle, and to such a vehicle operatable by muscle power and/or motor power.

BACKGROUND INFORMATION

It is conventional to provide locks at vehicles, for example electric bicycles, which allow a battery to be secured at the vehicle. Such locks, on the one hand, effectuate a mounting of the battery at the vehicle, for example to prevent the battery from falling out of a frame due to vibrations while riding. On the other hand, such locks allow a theft protection of the battery to prevent unauthorized removal of the battery. To remove the battery, for example to charge it, it is usually necessary to unlock the lock with the aid of a key.

SUMMARY

A lock system according to an example embodiment of the present invention offers the advantage of a system for securing a battery of a vehicle operable by muscle power and/or motor power which is particularly easy and comfortable to use. The vehicle is preferably an electric bicycle. The battery may preferably be secured on or within a frame of the vehicle with the aid of the lock system. The lock system at the same time enables a theft protection and a comfortable removal of the battery with the aid of a simple and reliable design. According to the present invention, this is achieved by a lock system, including a deadbolt, a lock cylinder, and a lifting element. The deadbolt is pivotable about a bolt axis and, in the process, is movable into a holding position and into a release position. In the holding position, the deadbolt prevents the battery from being removed in a removal direction, in particular by the deadbolt blocking a movement of the battery in the removal direction. In the release position, the deadbolt allows the battery to be removed in the removal direction.

In accordance with an example embodiment of the present invention, the lock cylinder is configured to actuate the deadbolt. The lock cylinder is preferably designed to move the deadbolt from the holding position into the removal position. As an alternative or in addition, the lock cylinder may be designed to move the deadbolt from the removal position into the holding position. The lock cylinder is preferably designed to be actuatable with the aid of a key. As an alternative or in addition, the lock cylinder may be designed to be actuatable with the aid of an actuator. For example, an electric actuator or an electromagnetic actuator may be provided as the actuator, which particularly preferably is designed to be actuatable with the aid of a radio signal. For example, such an actuator may be designed to be actuatable with the aid of a remote control and/or with the aid of an input device of a user of the vehicle.

Furthermore, in accordance with an example embodiment of the present invention, the lifting element is coupled to the lock cylinder and configured to move the battery in the removal direction when the deadbolt is moved from the holding position into the release position. In the process, the lifting element preferably effectuates a lifting of the battery in the removal direction. A removal of the battery out of or from the vehicle, for example from a mount within a vehicle frame, is thereby facilitated.

The lifting element may preferably be designed to be actuatable directly or indirectly with the aid of the lock cylinder. For example, the lifting element may be directly engaged with the lock cylinder for a direct actuation. As an alternative, the lifting element may be engaged with the deadbolt, and may thus be indirectly actuatable with the aid of the lock cylinder.

This means that, as a result of an actuation of the lock cylinder, for example by a key actuation or with the aid of an actuator, the battery may be moved in the removal direction with the aid of the lifting element, so that the battery is easily accessible for an operator and easy to remove. In particular, in the case of batteries situated within a vehicle frame, which are well-protected and visually hidden in the frame, but usually difficult to access, the lock system considerably facilitates a removal of the batteries. The special design thus, in particular, offers a mechanical lifting mechanism for lifting the battery, which may be actuated by the operator via the lock cylinder. In this way, an easy and comfortable removal of the battery is possible, for example, even when a mount of the battery is soiled.

Preferred refinements of the present invention are disclosed herein.

In accordance with an example embodiment of the present invention, the lifting element is preferably situated at the deadbolt. For example, the lifting element may be a pin- or lever-like extension at the deadbolt which, during a movement of the deadbolt into the removal position, rests against the battery, and lifts the battery in the process. The deadbolt is preferably designed as a double-sided lever, one free end of the double-sided lever forming the lifting element, and another free end of the lever being able to block a movement of the battery in the removal direction. It is particularly favorable in the process when the bolt axis is situated in the removal direction between the two free ends of the double-sided lever. In this way, a particularly simple and cost-effective design of the lock system is made possible, which, due to a simple mechanism, allows a reliable function at any time, for example also with heavy soiling.

The lifting element is particularly preferably pivotably situated about a lifting axis, the lifting axis preferably being situated in parallel to the bolt axis. In particular, it is favorable in the process when the lifting element is provided as a separate component from the deadbolt. For example, the lifting element may be designed as a double-sided lever, one free end of the lever being able to rest against the battery, and another free end being designed to be actuatable directly or indirectly with the aid of the lock cylinder, and the lifting axis being situated between the respective contact points of the two free ends of the lifting element. In this way, for example depending on the arrangement of the lifting axis, a lever arm via which a force is applied onto the battery for moving the battery may be adapted, and thereby a support of the removal by actuation of the lock cylinder may be further optimized.

The lifting element is advantageously pivotable about the lifting axis with the aid of an actuation by the deadbolt. In particular, the deadbolt may be made to rest against the lifting element when rotated about the bolt axis, as a result of which the lifting element pivots about the lifting axis, and thereby presses against the battery to effectuate the movement of the battery in the removal direction. For example, it is also possible in the process to situate the lifting element in such a way that the deadbolt is able to rotate freely by a predefined angle during the movement from the holding position to the release position before the deadbolt actuates the lifting element. In this way, for example, mutual blocking or jamming of the lifting element and the deadbolt when unlocking the lock system may be reliably avoided.

In accordance with an example embodiment of the present invention, it is furthermore advantageous when the deadbolt includes a retaining element which engages in the battery in a form-locked manner when the deadbolt is in the holding position. For example, the retaining element may have a hook-shaped design. As an alternative, the retaining element may include a straight engagement edge, for example, which is, in particular, situated perpendicular to the removal direction. The retaining element is preferably configured to engage in a recess or a projection of the battery. As an alternative, the retaining element may engage in a form-locked manner with an outer edge of the battery and thereby prevent a movement of the battery in the removal direction.

The retaining element preferably includes an insertion chamfer. The insertion chamfer is configured, during an insertion of the battery, in particular in a direction opposite the removal direction, to move the deadbolt into the release position. In the process, the insertion chamfer preferably defines a foremost edge of the deadbolt, situated in the removal direction, with which the battery comes in contact first during insertion. The insertion chamfer is preferably situated at an angle of less than 90° with respect to the removal direction. This means that, during insertion of the battery, the insertion chamfer causes the deadbolt to be automatically pushed away laterally about the bolt axis into the release position to enable the insertion of the battery. In this way, a simple and comfortable operation of the lock system is possible, an actuation of the lock cylinder not being required for insertion, but only for removal of the battery. The lock system furthermore preferably includes a return spring, which is configured to return the deadbolt into the holding position with the aid of a return elasticity. The return elasticity preferably acts in the direction from the release position to the holding position. This means that, in an unactuated state of the deadbolt, the return spring with the aid of the return elasticity causes the deadbolt to be held in the holding position. In this way, the battery is prevented from inadvertently detaching or falling out, and additionally a simple theft protection is achieved.

Further preferably, the lock cylinder includes an, in particular cylindrical, lock body which is rotatable about a lock axis. The lock axis is preferably perpendicular to the removal direction, and particularly preferably parallel to the bolt axis. A key is preferably insertable into the lock body, with the aid of which a rotation of the lock body about the lock axis is made possible. As an alternative or in addition, the lock cylinder may include an actuator, for example a servo motor or an electromagnetic actuator, which is configured to cause the lock cylinder to rotate.

The lock cylinder particularly preferably includes a lock pin, which extends in parallel to the longitudinal axis and is eccentrically situated at the lock body. The lock pin is configured to engage in the deadbolt. In the process, the lock pin preferably engages in a recess of the deadbolt. By eccentrically situating the lock pin at the lock body, the lock pin moves on a circular path when the lock body is rotated about the lock axis. In the process, the lock pin, in particular, also carries out a movement component perpendicular to the removal direction, as a result of which the deadbolt is accordingly pivoted about the bolt axis. In this way, a simple and reliable option for an actuation of the deadbolt by the lock cylinder results.

The lock cylinder is preferably rotatable into a locking position and into a removal position. In the removal position, the lock pin of the lock cylinder is engaged with the deadbolt in such a way that the deadbolt is held in the release position. In the locking position, the lock pin is situated and engaged with the deadbolt in such a way that the lock pin holds the deadbolt in the holding position. In particular, the lock pin in the latter case prevents the deadbolt from being able to move into the release position, for example due to undesirable force application on the deadbolt. In the locking position, the lock cylinder thus, in particular, effectuates a forced locking, which is preferably exclusively releasable by a key actuation and/or an actuation of an actuator. In this way, the lock system may be brought into a particularly theft-proof configuration. Moreover, by rotating the lock cylinder into the removal position, the deadbolt may be easily pulled back to release the battery for removal, the lifting element in the process, as described above, effectuating a lifting of the battery in the removal direction for easy removal.

The lock cylinder is particularly preferably also rotatable into an insertion position, in which the lock pin allows a movement of the deadbolt from the holding position into the release position, and in the opposite direction. For this purpose, a recess of the deadbolt, in which the lock pin engages, is preferably configured in such a way that the deadbolt is able to carry out a movement relative to the lock pin, namely a pivoting from the holding position into the release position. With respect to a rotation about the lock axis, the locking position is preferably situated between the insertion position and the removal position. The insertion position thus enables an easy and comfortable insertion of the battery, without the need to actuate the lock cylinder.

In accordance with an example embodiment of the present invention, the lock system furthermore advantageously includes a locking spring, which is configured to rotate the lock cylinder into the locking position with the aid of a locking elasticity. This means that the locking spring, in particular, causes the lock cylinder, in the non-actuated state, to be rotated from the insertion position into the locking position with the aid of the locking elasticity. The locking spring may, in particular, be configured as a return spring. Unless the lock cylinder is actuated, in particular a forced locking is thus present, to achieve particularly theft-proof securing of the battery.

Further preferably, the deadbolt includes a detent device, which allows the lock cylinder to latchingly engage in the insertion position. For this purpose, the lock pin of the lock cylinder may preferably latchingly engage at detent elements of the lock cylinder. In the process, a detent force of the detent device acts, in particular, against the locking elasticity. The detent force is preferably greater than or equal to the locking elasticity. The detent force and the locking elasticity are preferably matched to one another in such a way that an abrupt snapping back of the deadbolt, for example as a result of a return with the aid of the return spring, after the battery has been completely inserted, causes the detent force to be overcome, so that the lock cylinder is rotated into the locking position by the locking spring. In this way, in particular, an automatic forced locking after the insertion of the battery may take place.

In accordance with an example embodiment of the present invention, the lock system furthermore preferably includes a removal spring. The removal spring is configured to apply a removal elasticity in the removal direction onto the battery. In this way, the key-actuated lifting of the battery with the aid of the spring element is additionally supported by the removal elasticity, as a result of which an even easier removal of the battery is possible.

The present invention furthermore relates to a vehicle operable by muscle power and/or motor power, including a battery and an above-described lock system. The lock system is preferably configured to secure the battery at the vehicle, in particular, within a bicycle frame, and to enable a key-actuated and/or actuator-actuated release for removal of the battery.

BRIEF DESCRIPTION OF THE DRAWINGS

Exemplary embodiments of the present invention are described hereafter in greater detail with reference to the figures. Identical or functionally equivalent components are always denoted by the same reference numerals.

DETAILED DESCRIPTION OF EXAMPLE EMBODIMENTS

Figure 1:
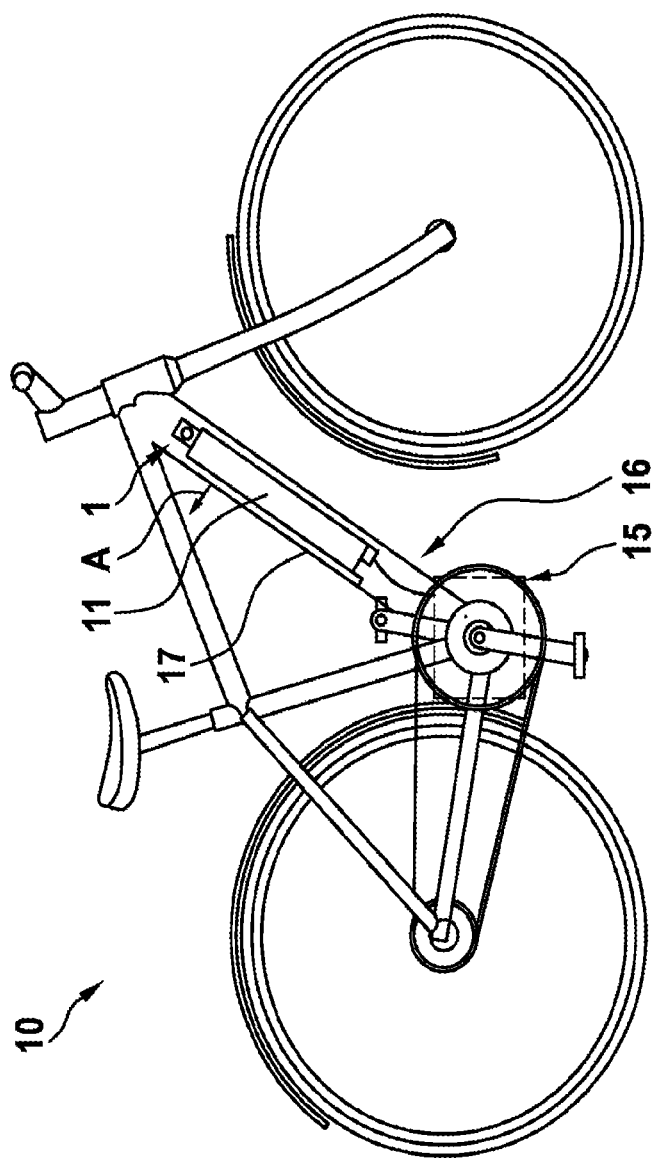
FIG. 1 shows a simplified schematic representation of an electric bicycle including a lock system according to a first exemplary embodiment of the present invention.

FIG. 1 shows a vehicle operable by muscle power and/or motor power. The vehicle is an electric bicycle 10 including an electric motor 15, for supporting a pedaling force of a rider. Electric motor 15 is supplied with electric energy by a battery 11.

Battery 11 is situated within a vehicle frame 16. Battery 11 is accessible via a removable cover 17 of vehicle frame 16. To secure battery 11 within vehicle frame 16, electric bicycle 10 includes a lock system 1. Lock system 1 allows battery 11 to be secured at electric bicycle 10 for mounting and theft protection. In addition, lock system 1 provides an easy and comfortable option for removing battery 11 in removal direction A, for example to be able to charge battery 11 after the removal.

The design and operating mode of preferred exemplary embodiments of lock system 1 are described hereafter with respect to FIGS. 2 through 7.

Figure 2:
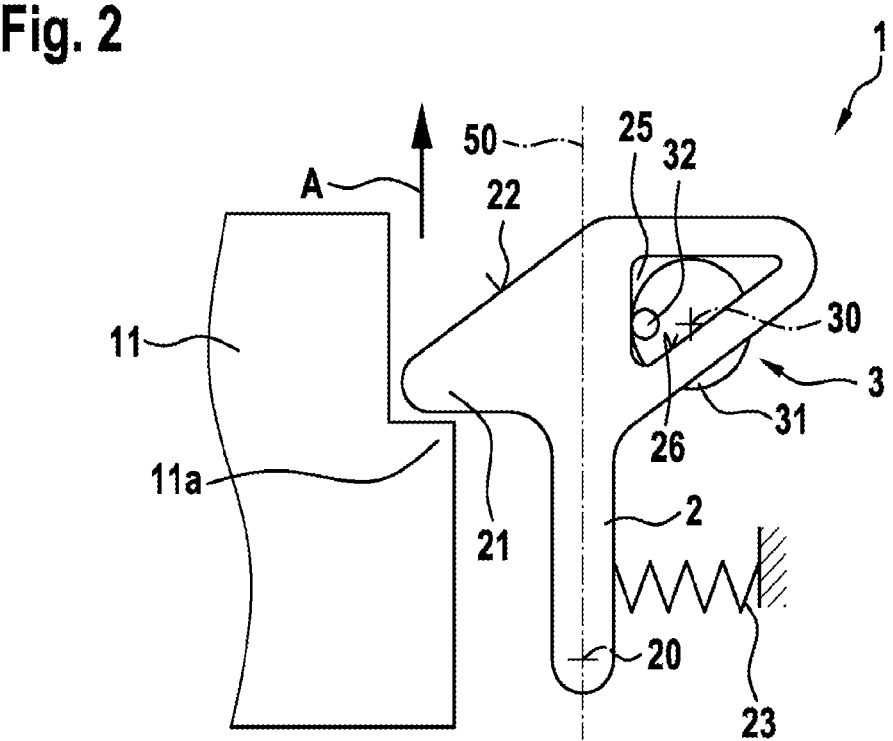
FIG. 2 shows the lock system of the first exemplary embodiment of FIG. 1 in detail and in the closed state.

FIGS. 2 through 5 show a lock system 1 according to a first exemplary embodiment of the present invention. FIG. 2 shows lock system 1 and a section of battery 11, which is secured by lock system 1. For this purpose, lock system 1 includes a deadbolt 2, which prevents or enables a movement of battery 11 in removal direction A.

To prevent a removal, i.e., to hold battery 11 at electric bicycle 10, deadbolt 2 includes a retaining element 21, which is configured to engage in a projection 11a of battery 11 in a form-locked manner. In this holding position shown in FIG. 2, deadbolt 2 essentially extends along a removal axis 50, which is in parallel to removal direction A.

Figure 3:
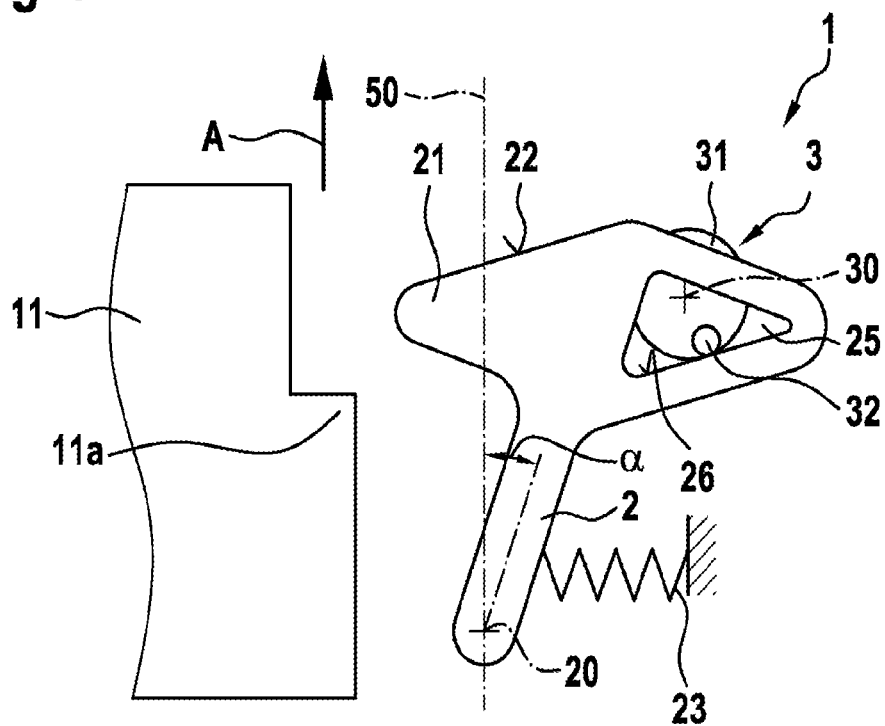
FIG. 3 shows the lock system of FIG. 2 in the open state.

To release battery 11, i.e., to allow a removal of battery 11 in removal direction A, deadbolt 2 may be pivoted about a bolt axis 20 from the holding position into a release position, which is shown in FIG. 3. In the release position, retaining element 21 does not engage in projection 11a of battery 11, as a result of which a movement of battery 11 in removal direction A is enabled, and thus a removal is possible. In the release position, deadbolt 2 is pivoted about an angle α with respect to the holding position, in particular, pivoted away from battery 11.

For actuating deadbolt 2, lock system 1 includes a lock cylinder 3, which is configured to be actuatable with the aid of a key. Lock cylinder 3 includes a cylindrical lock body 31, which is rotatable about a lock axis 30 parallel to bolt axis 20. Lock cylinder 3 furthermore includes a lock pin 32, which extends proceeding from lock body 31 in the direction of lock axis 30. Lock pin 32 is eccentrically situated at lock body 31 in the process, and is thus moved on a circular path during the rotation of lock body 31 about lock axis 30. Lock pin 32 engages in a triangular recess 25 of deadbolt 2, as a result of which lock cylinder 3 is able to pivot deadbolt 2 accordingly about lock axis 20, as is described in greater detail hereafter.

Figure 4:
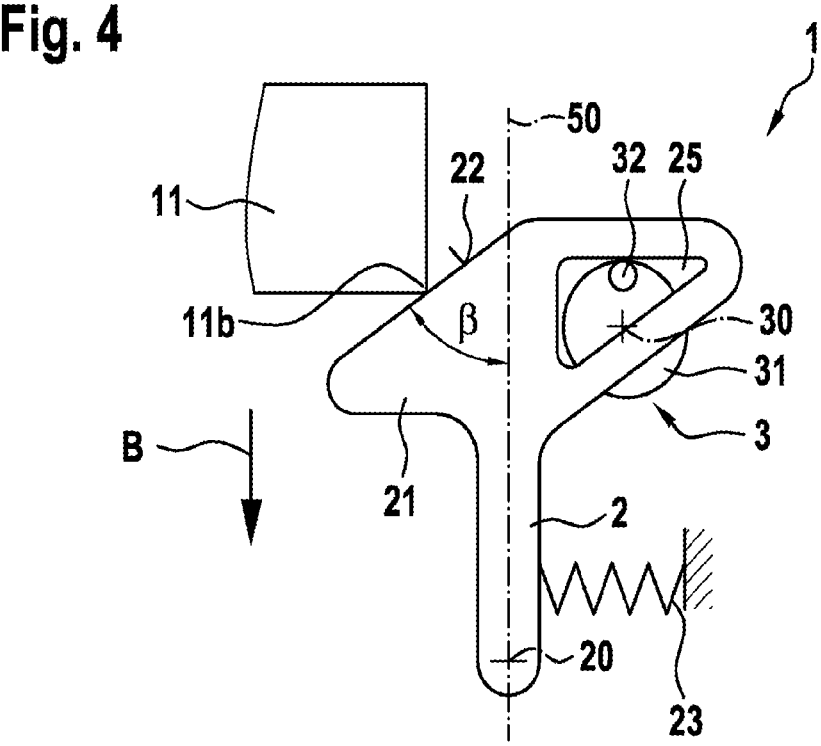
FIG. 4 shows a lock system of FIG. 2 in an insertion state.

Lock cylinder 3 is rotatable into three different positions, namely into a locking position (FIG. 2), a removal position (FIG. 3), and an insertion position (FIG. 4).

In the locking position, lock pin 32 of lock cylinder 3, as shown in FIG. 2, is situated in such a way that it holds deadbolt 2 in the holding position. A pivoting of deadbolt 2 from the holding position into the release position is blocked in the process by lock pin 32. This state represents a forced locking, in which a removal of battery 11 is easily and reliably prevented. In the process, lock pin 32 prevents deadbolt 2 from being inadvertently, for example as a result of vibrations, or the application of another exterior force on deadbolt 2, into the release position.

For removing battery 11, lock cylinder 3 may be rotated into the removal position shown in FIG. 3. According to the view of FIG. 3, this corresponds to a counterclockwise rotation. During rotation, lock pin 32 pushes against a chamfer 26 of deadbolt 2, as a result of which deadbolt 2 is pivoted into the release position. In this state, a removal of battery 11 in removal direction A is possible.

As soon as lock cylinder 3 is no longer rotated into the removal position, deadbolt 2 is automatically returned into the holding position. For this purpose, lock system 1 includes a return spring 23, which applies a return elasticity onto deadbolt 2 to return it into the holding position.

In addition, lock cylinder 3 is rotatable into an insertion position, which is shown in FIG. 4. For this purpose, the lock cylinder is rotated clockwise from the locking position (see FIG. 2) by 90° about lock axis 30. In this position, a pivoting of deadbolt 2 from the shown holding position into the release position (see FIG. 3) is unblocked since deadbolt 2, due to the triangular shape of recess 25, is not blocked by lock pin 32.

The insertion position enables an easy and comfortable insertion of battery 11 in insertion direction B, which is counter to removal direction A, without the need to actuate lock cylinder 3. This is possible since retaining element 21 includes an insertion chamfer 22, which during an insertion of battery 11 effectuates an automatic pivoting of deadbolt 2 from the holding position into the release position. For this purpose, insertion chamfer 22 is situated at an angle β with respect to insertion axis 50 when deadbolt 2 is in the holding position. When battery 11, as shown in FIG. 4, is inserted in insertion direction B, an edge 11b of battery 11 pushes against insertion chamfer 22, thus pushing deadbolt 2 from the holding position into the release position. After battery 11 has been completely inserted, deadbolt 2 is returned by return spring 23 into the holding position again, so that battery 11 is held by the form-locked engagement with retaining element 21.

Figure 5:
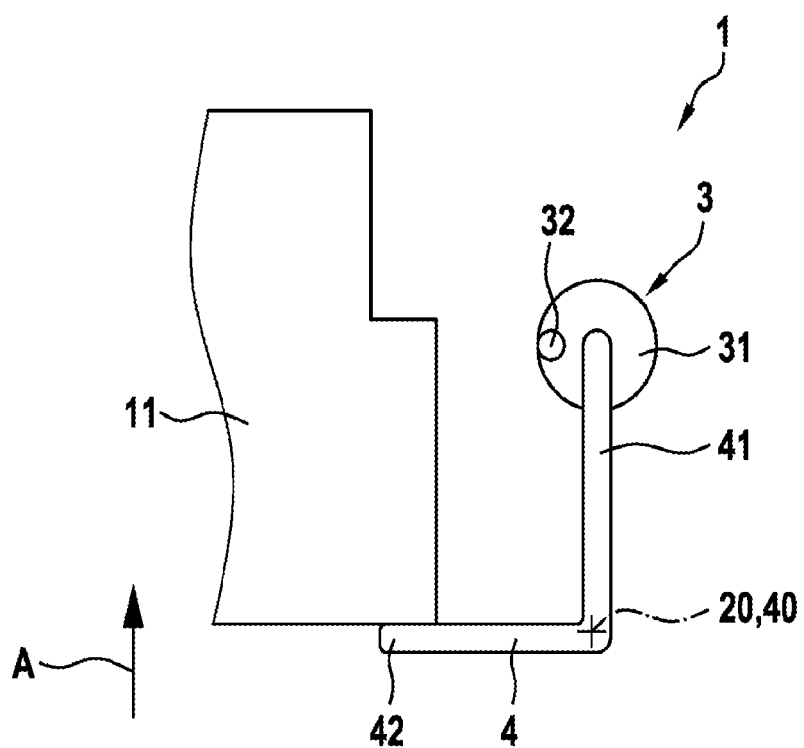
FIG. 5 shows another view of the lock system of FIG. 2.

Lock system 1 additionally includes a lifting element 4, which is shown in FIG. 5. FIG. 5 shows a view of lock system 1 of first exemplary embodiment of FIGS. 2 through 4 in an alternative view. In detail, FIG. 5 shows a view of lock system 1 of FIG. 2 in another plane along bolt axis 20.

Lifting element 4 is pivotable about a lifting axis 40, lifting axis 40 being identical to bolt axis 20 in the first exemplary embodiment. Lifting element 4 is configured as a double-sided lever. A first free end 41 is actuatable with the aid of lock pin 32 of lock cylinder 3. Lifting element 4 is thus directly actuatable with the aid of lock cylinder 3. During a rotation of lock cylinder 3 from the locking position, which is shown in FIG. 5, into the removal position (see FIG. 3), lock pin 32 pushes against first free end 41 of lifting element 4, so that the lifting element is pivoted clockwise about lifting axis 40. As a result, a second free end 42 of lifting element 4 pushes in removal direction A against battery 11, as a result of which it is moved in removal direction A, i.e., is lifted.

As a result, not only is deadbolt 2 pulled back to release battery 11 during a rotation of lock cylinder 3 into the removal position, but additionally battery 11 is lifted in removal direction A by lifting element 4. In this way, a user of electric bicycle 10 may very easily and comfortably release and lift battery 11 with the aid of a key actuation, as a result of which an easy removal of battery 11 is possible.

Figure 6:
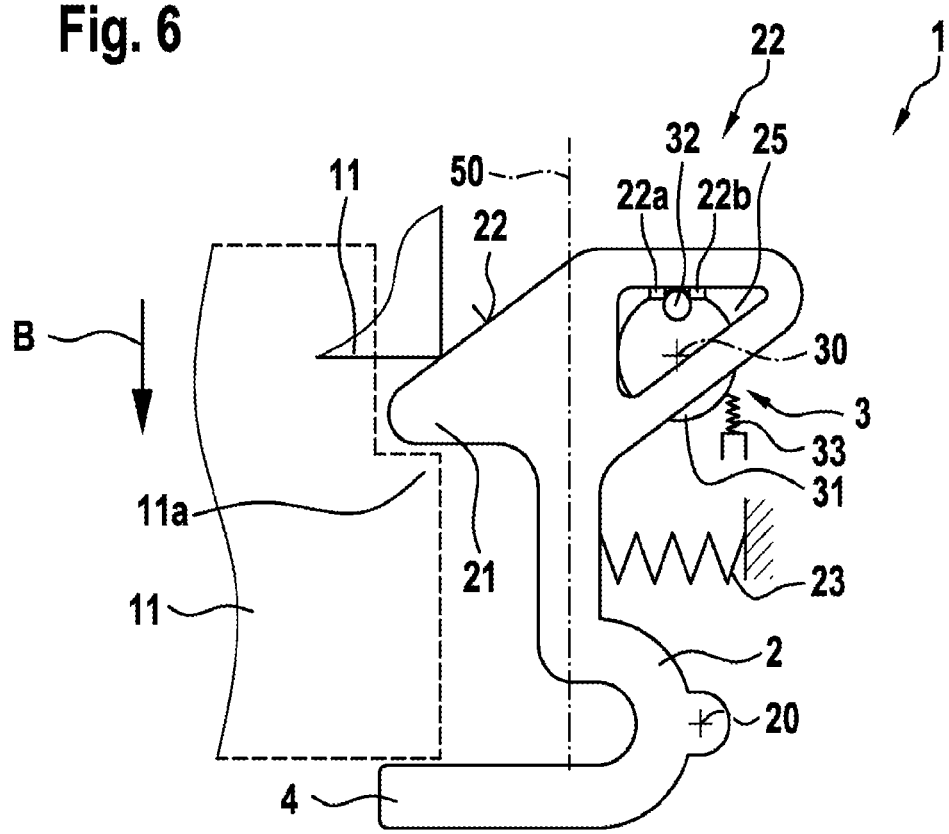
FIG. 6 shows a lock system according to a second exemplary embodiment of the present invention.

FIG. 6 shows a lock system 1 according to a second exemplary embodiment of the present invention. The second exemplary embodiment essentially corresponds to the first exemplary embodiment, with an alternative configuration of lifting element 4. Moreover, a detent device 22 and a return mechanism of lock cylinder 3 are additionally provided. FIG. 6 shows a state during the insertion of battery 11, similarly to FIG. 4. To illustrate the function of lifting element 4 with an inserted battery 11, the battery is additionally shown in the inserted state with dotted lines.

In the second exemplary embodiment of FIG. 6, lifting element 4 is situated at deadbolt 2. Lifting element 4 is designed in one piece with deadbolt 2. Lifting element 4 and deadbolt 2 are consequently situated in the same plane along bolt axis 20. Bolt axis 20 is situated above removal axis 50 to the right, i.e., offset away from battery 11.

In the second exemplary embodiment, deadbolt 2 is thus configured as a double-sided lever, which, at each of its free ends, namely retaining element 21 and lifting element 4, may be brought into engagement with battery 11. Bolt axis 20 is situated between retaining element 21 and lifting element 4 with respect to removal direction A.

Similarly to the first exemplary embodiment, a pivoting of deadbolt 2 into the release position also takes place during a rotation of lock cylinder 3 into the removal position in the second exemplary embodiment, as a result of which battery 11 may be removed. In the process, a lifting of battery 11 in removal direction A also takes place with the aid of lifting element 4 situated at deadbolt 2. In the second exemplary embodiment, lifting element 4 is thus actuatable via deadbolt 2, and thus indirectly with the aid of lock cylinder 3.

Furthermore, lock system 1 of the second exemplary embodiment of FIG. 6 includes a locking spring 33. Locking spring 33 is situated at lock cylinder 3 and exerts a locking elasticity onto lock cylinder 3, so that the lock cylinder is returned from the insertion position into the locking position. To enable a comfortable insertion of the battery, lock system 1 of the second exemplary embodiment furthermore includes a detent device 22, with the aid of which lock cylinder 3 may latchingly engage in the insertion position.

Detent device 22 includes a first detent element 22a and a second detent element 22b. Both detent elements 22a, 22b are provided at deadbolt 2 and each project into recess 25. The two detent elements 22a, 22b are situated at the upper rim of recess 25, as viewed in removal direction A, so that lock pin 32 of lock cylinder 3 is able to latchingly engage between the two detent elements 22a, 22b when lock cylinder 3 is in the insertion position. In the process, first detent element 22a exerts a detent force onto lock pin 32, which is counter to and slightly greater than the locking elasticity. Lock cylinder 3 is thus held in the insertion position shown in FIG. 6 by detent device 22.

During an insertion of battery 11 in insertion direction B, deadbolt 2 is slowly pivoted clockwise about bolt axis 20 into the insertion position. In the process, lock cylinder 3 is also co-rotated clockwise due to detent device 22. As soon as battery 11 assumes the position plotted with dotted lines, retaining element 21 slides over projection 11a. In the process, deadbolt 2 abruptly snaps back into the holding position as a result of return spring 23. Due to this abrupt snapping back, locking pin 32 overcomes the detent force of detent device 22, as a result of which lock cylinder 3 is automatically returned into the locking position by lock spring 33.

With lock system 1 according to the second exemplary embodiment, a user thus receives a device which enables very secure attachment of battery 11 at electric bicycle 10, while being particularly easy and comfortable to operate. For this purpose, for example for removing battery 11, the user may rotate lock cylinder 3 into the removal position (similarly to FIG. 3) and subsequently, after the removal of battery 11, may rotate it into the insertion position (see FIG. 6). The latching engagement of lock cylinder 3 in the insertion position thus allows battery 11 to be re-inserted without key actuation. As a result of the described automatic return of lock cylinder 3 into the locking position after the insertion, an automatic forced locking thus takes place after battery 11 has been inserted, as a result of which battery 11 is locked particularly securely.

Figure 7:
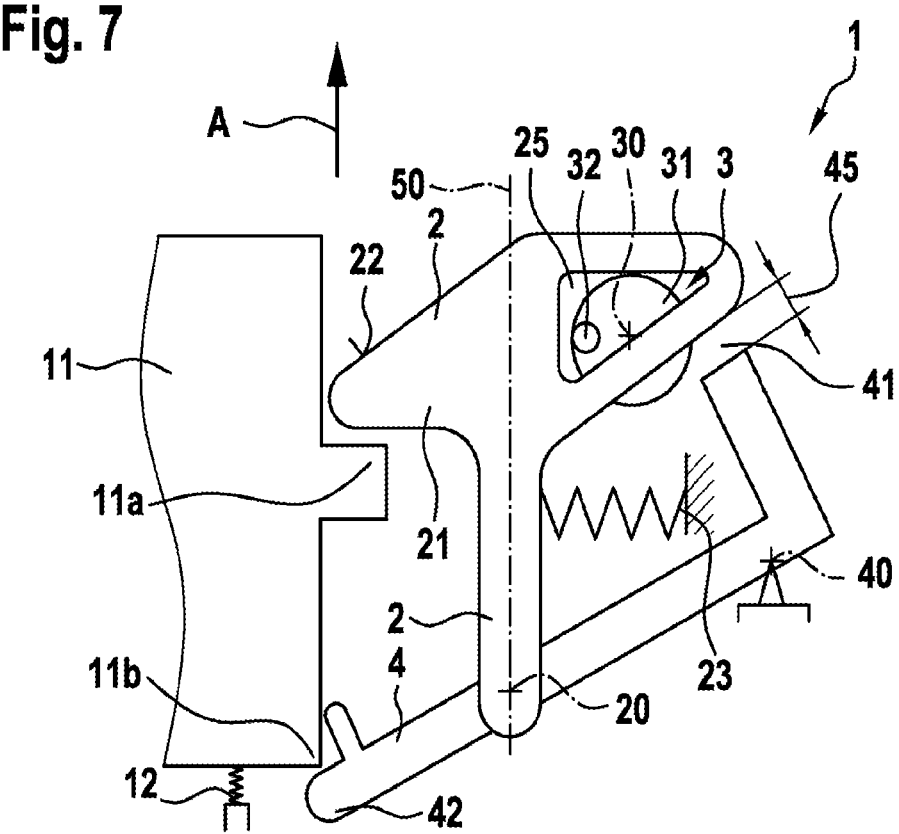
FIG. 7 shows a lock system according to a third exemplary embodiment of the present invention.

FIG. 7 shows a lock system 1 according to a third exemplary embodiment of the present invention. The third exemplary embodiment essentially corresponds to the first exemplary embodiment, with another alternative configuration of lifting element 4. Similarly to the first exemplary embodiment, lifting element 4 in the third exemplary embodiment is configured as a double-sided lever and as a separate component. In contrast to the first exemplary embodiment, lifting element 4 in the third exemplary embodiment, however, is rotatable about a lifting axis 40 provided separately from bolt axis 20. Lifting axis 40 is situated on a side of deadbolt 2 which faces away from battery 11.

A first free end 41 of lifting element 4 is actuatable with the aid of deadbolt 2. A second free end 42 may surround edge 11b of battery 11 during a pivoting of lifting element 4 about lifting axis 40, and may thereby lift battery 11 in removal direction A. This means that, in the third exemplary embodiment of FIG. 7, lifting element 4 is indirectly actuatable via deadbolt 2 by lock cylinder 3.

Furthermore, a distance 45 is provided between deadbolt 2 and first free end 41 of lifting element 4 when, as is shown in FIG. 7, deadbolt 2 is in the holding position, and second free end 42 of lifting element 4 rests against edge 11b of battery 11. In this way, deadbolt 2 may be pivoted by a certain angle of approximately 5° in the direction of the release position before deadbolt 2 actuates lifting element 4. As a result, battery 11 is not directly lifted at the beginning of a rotation of lock cylinder 3, but only after rotation by a certain angle. In this way, in particular, a possible jamming of battery 11 during unlocking and lifting, and also during insertion, may be avoided. As an alternative, however, it is also possible to configure distance 45 to be equal to zero, as a result of which an indirect actuation of lifting element 4 occurs upon actuation of lock cylinder 3.

In addition, lock system 1 of the third exemplary embodiment includes a removal spring 12. Removal spring 12 is situated below battery 11 and, with battery 11 inserted, exerts a removal elasticity in removal direction A on battery 11. Removal spring 12 thus supports a lifting of battery 11 in removal direction A during a corresponding actuation of lock cylinder 3, as a result of which the removal of battery 11 is further facilitated.

What is claimed is:

1. A lock system for securing a battery of a vehicle operable by muscle power and/or motor power, the vehicle being an electric bicycle, the lock system comprising:
    a lifting element;
    a deadbolt; and
    a lock cylinder that is configured to actuate the deadbolt to pivot the deadbolt about a bolt axis between (a) a holding position preventing a removal of the battery in a removal direction and (b) a release position allowing the removal of the battery, wherein the lifting element is configured to move the battery in the removal direction when the deadbolt is moved from the holding position into the release position.

2. The lock system as recited in claim 1, wherein the lifting element is formed integrally with the deadbolt.

3. The lock system as recited in claim 1, further comprising:
    a return spring which is configured to return the deadbolt into the holding position with the aid of a return elasticity.

4. The lock system as recited in claim 1, further comprising:
    a removal spring configured to apply a removal elasticity in the removal direction onto the battery.

5. The lock system as recited in claim 1, wherein the lock system includes at least one of the following four features (I)-(IV):
    (I) when the lock cylinder actuates the deadbolt to move into the release position, the lock cylinder applies to the lifting element a force that moves the lifting element in a direction by which the lifting element moves the battery in the removal direction;
    (II) the lifting element is pivotable about a lifting axis;
    (III) the lock cylinder includes: (a) a lock body that is rotatable about a lock axis and (b) a lock pin that is configured to engage in the deadbolt, extends parallel to the lock axis, and is eccentrically situated relative to the lock body; and
    (IV) the deadbolt includes a retaining element that engages in a form-locked manner in the battery when the deadbolt is in the holding position.

6. The lock system as recited in claim 5, when the lock cylinder actuates the deadbolt to move into the release position, the lock cylinder applies to the lifting element the force that moves the lifting element in the direction by which the lifting element moves the battery in the removal direction.

7. The lock system as recited in claim 5, wherein the lifting element is pivotable about the lifting axis.

8. The lock system as recited in claim 5, wherein the lock cylinder includes: (a) the lock body that is rotatable about the lock axis and (b) the lock pin that is configured to engage in the deadbolt, extends parallel to the lock axis, and is eccentrically situated relative to the lock body.

9. The lock system as recited in claim 7, wherein the lifting axis is parallel to the bolt axis.

10. The lock system as recited in claim 9, wherein the lifting element is pivotable about the lifting axis with the aid of actuation by the deadbolt.

11. The lock system as recited in claim 5, wherein the deadbolt includes the retaining element that engages in the form-locked manner in the battery when the deadbolt is in the holding position.

12. The lock system as recited in claim 11, wherein the retaining element includes an insertion chamfer which is configured to move the deadbolt into the release position during an insertion of the battery, opposite the removal direction.

13. The lock system as recited in claim 5, wherein the lock cylinder includes the lock body that is rotatable about the lock axis and the lock body is cylindrical.

14. The lock system as recited in claim 13, wherein the lock cylinder includes the lock pin that extends parallel to the lock axis, is eccentrically situated relative to the lock body, and is configured to engage in the deadbolt.

15. The lock system as recited in claim 1, wherein the lock cylinder is rotatable (a) into a removal position in which the lock pin holds the deadbolt in the release position and (b) into a locking position in which the lock pin holds the deadbolt in the holding position.

16. The lock system as recited in claim 15, wherein the lock cylinder is rotatable into an insertion position in which the lock pin allows a movement of the deadbolt (a) from the holding position into the release position and (b) from the release position into the holding position.

17. The lock system as recited in claim 15, further comprising:
    a locking spring configured to return the lock cylinder into the locking position with the aid of a locking elasticity.

18. The lock system as recited in claim 17, wherein:
    the lock cylinder is rotatable into an insertion position in which the lock pin allows a movement of the deadbolt (a) from the holding position into the release position and (b) from the release position into the holding position; and
    the deadbolt includes a detent device which allows a latching engagement of the lock cylinder in the insertion position and a detent force;
    acting against the locking elasticity; and
    being greater than or equal to the locking elasticity.

19. A vehicle operable by muscle power and/or motor power, the vehicle being an electric bicycle, the vehicle comprising:
    a battery; and
    a lock system for securing the battery to the vehicle, the lock system including:
        a lifting element;
        a deadbolt; and
        a lock cylinder that is configured to actuate the deadbolt to pivot the deadbolt about a bolt axis between (a) a holding position preventing a removal of the battery in a removal direction and (b) a release position allowing the removal of the battery, wherein the lifting element is configured to move the battery in the removal direction when the deadbolt is moved from the holding position into the release position.

20. The vehicle as recited in claim 19, wherein the lock system includes at least one of the following four features (I)-(IV):
- (I) when the lock cylinder actuates the deadbolt to move into the release position, the lock cylinder applies to the lifting element a force that moves the lifting element in a direction by which the lifting element moves the battery in the removal direction;
- (II) the lifting element is pivotable about a lifting axis;
- (III) the lock cylinder includes: (a) a lock body that is rotatable about a lock axis and (b) a lock pin that is configured to engage in the deadbolt, extends parallel to the lock axis, and is eccentrically situated relative to the lock body; and
- (IV) the deadbolt includes a retaining element that engages in a form-locked manner in the battery when the deadbolt is in the holding position.

\* \* \* \* \*